June 19, 1934.  E. J. MAUST  1,963,588
MANUFACTURE OF CEMENT
Filed Feb. 11, 1930  2 Sheets-Sheet 1
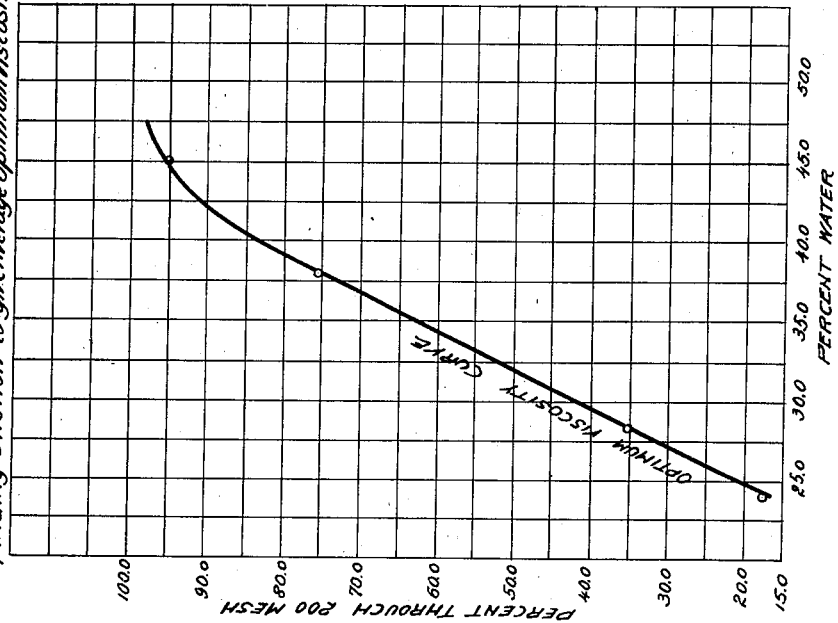
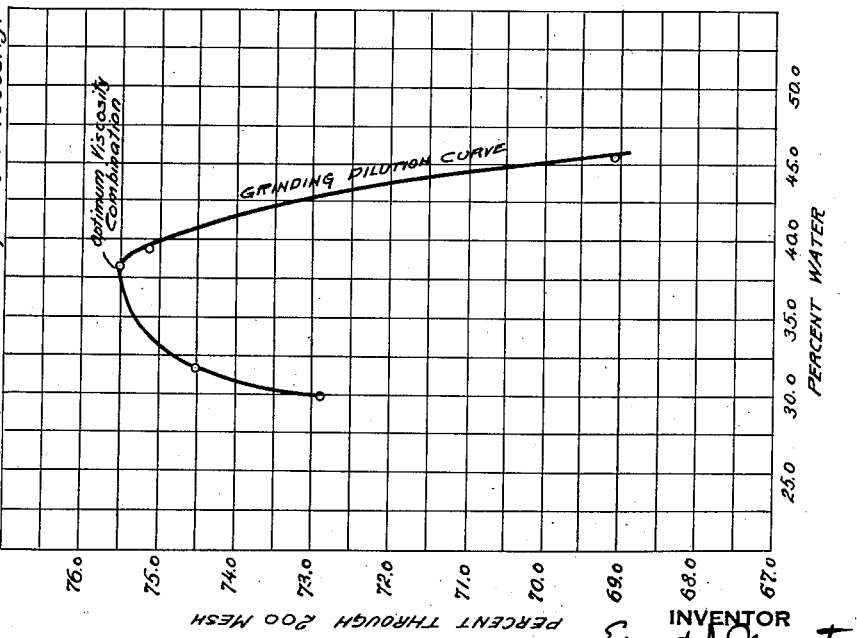
INVENTOR
Ernest J. Maust
BY
Pennie, Davis, Marvin & Edmonds
ATTORNEY

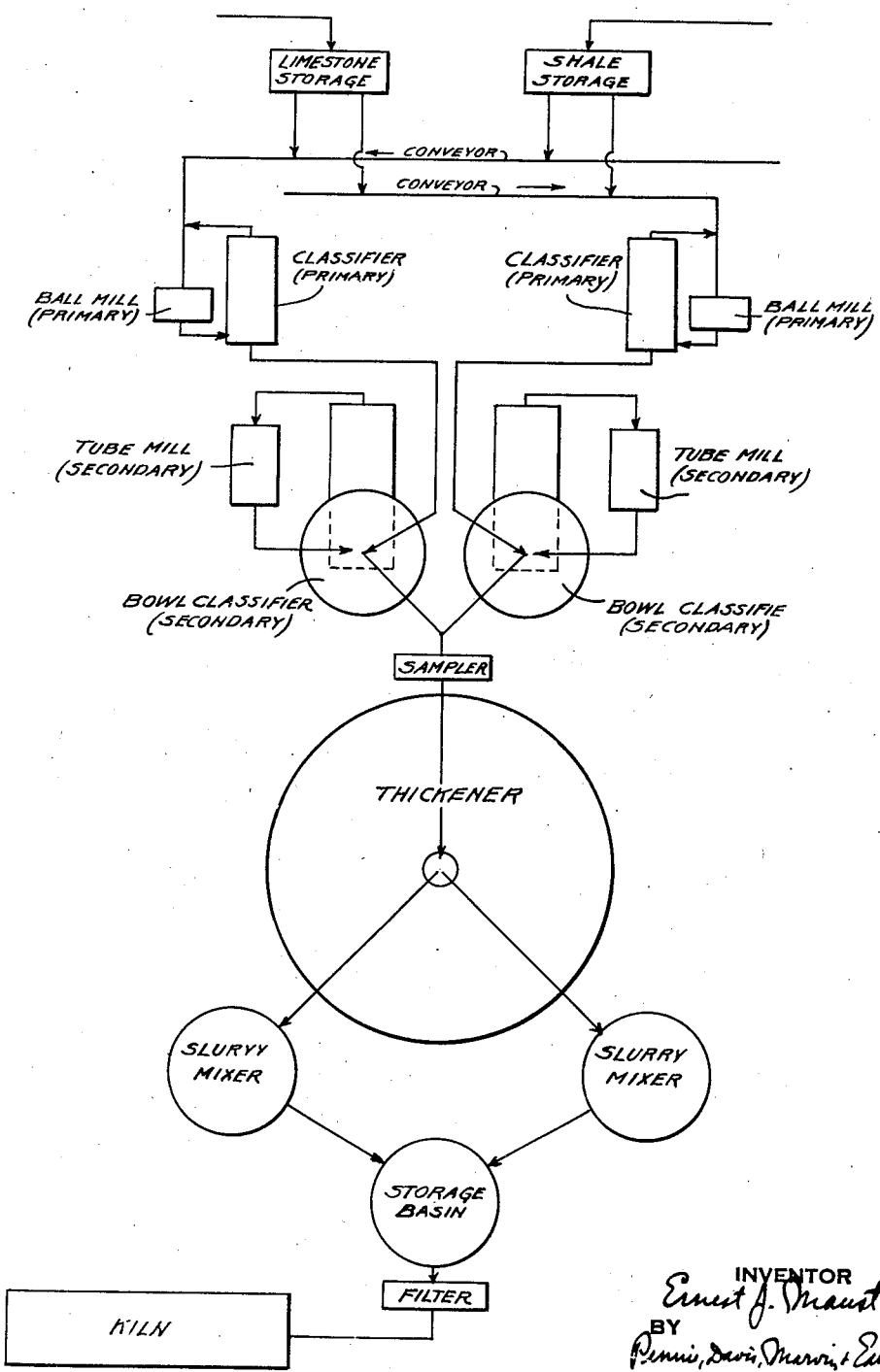

Patented June 19, 1934

1,963,588

UNITED STATES PATENT OFFICE 1,963,588

MANUFACTURE OF CEMENT

Ernest J. Maust, New York, N. Y., assignor, by mesne assignments, to The Dorr Company, Inc., New York, N. Y., a corporation of Delaware Application February 11, 1930, Serial No. 427,540

9 Claims. (Cl. 83—94)

This invention relates to the manufacture of Portland cement having a high early strength. Ordinary Portland cement in a standard briquet test with a 1:3 standard sand mortar will show a tensile strength of about 100 pounds per square inch at the end of one day, while a recognized high early strength cement will show about 300 pounds per square inch in the same test.

Portland cement is made by finely grinding an intimate and properly proportioned mixture of calcareous and argillaceous materials, such as limestone and shale, burning or clinkering the mixture to incipient fusion, and pulverizing the resulting clinker. Although the composition of the cement varies with the composition of the raw materials from which it is made, the following may be considered an average analysis:

| | Per cent |
|---|---|
| CaO, MgO, $Na_2O$, $K_2O$ | 67 |
| $Al_2O_3$, $Fe_2O_3$ | 10 |
| $SiO_2$ | 23 |

During burning, these oxides combine. The exact nature of the reactions is not fully understood and there is a difference of opinion as to the ultimate compounds formed in the clinker. Authorities are pretty well agreed, however, that in the average Portland cement the predominating compounds are tri-calcium aluminate ($3CaO.Al_2O_3$) dicalcium silicate ($2CaO.SiO_2$) and tri-calcium silicate ($3CaO.SiO_2$), and that of these, the tri-calcium silicate, is the one most responsible for the characteristic high early strength properties of the cement. Di-calcium silicate hydrates slowly and develops little strength for several weeks. Tri-calcium silicate, on the other hand, hydrates rapidly and develops considerable strength in one day. For this reason all cement manufacturers desiring to produce superior cements having a high early strength strive to increase the tri-calcium silicate at the expense of the di-calcium silicate, and proportion their batches accordingly.

In proportioning a batch the manufacturer seeks a lime silica ratio such that most of the lime will combine with silica to form the highly desirable tri-calcium silicate and leave no free lime. In the average cement, this consummation, however devoutly it may be wished, is seldom attained and the clinker will generally show some free lime, commonly as much as 1.5%. This lime is not only a detriment in its own right, producing unsoundness in the concrete, but is a symptom of an incomplete reaction. In such cements too great a proportion of the lime has combined with silica to form the less desirable di-calcium silicate, thereby reducing the theoretically possible amount of tri-calcium silicate that might have formed, and impairing the early strength accordingly.

There are, in the main, three factors which affect the completeness of the reactions occurring in the kiln when burning normal cement making material. These are: time, temperature and the fineness of the raw materials. The coarser the materials, the less intimate the contact among the particles and the more difficult to attain equilibrium under given time-temperature conditions. In a furnace charge containing relatively fine and coarse particles equilibrium among the fine particles will be easily reached, but a longer treatment at high temperatures will be required to cause the coarser particles to react. Indeed, under practical working conditions these coarser particles cannot be made to react, and the inevitable result is an inferior cement containing free lime and di-calcium silicate at the expense of the tri-calcium silicate. Experience has shown that in order to insure a practical completion of the reactions with the production of maximum tri-calcium silicate, and minimum di-calcium silicate and free lime, the raw materials fed to the kiln should be of such fineness that at least 95% passes a screen of 200 mesh. This fine grinding not only makes it possible to get the normal free lime into combination, but enables the manufacturer to employ more limestone than he would otherwise dare, thus still further increasing the tri-calcium silicate content of the cement. But to grind the raw materials to this extreme fineness is difficult.

Two main methods of grinding the raw materials are used—dry grinding and wet grinding. Dry grinding commonly requires more kilowatt hours per barrel to attain a satisfactory fineness than wet grinding and it is more difficult to mix and proportion the ingredients to the proper chemical composition in a dry ground charge than in one wet ground. A dry ground charge, however, has the advantage of entering the kiln in the proper condition and need not first be freed from considerable quantities of water. In practice wet grinding shows a considerable capacity advantage over dry grinding, this varying with the fineness of the finished product and the character of the raw material. It is the method in most general use. Wet grinding may be of two kinds: open circuit grinding and closed circuit grinding. In open circuit grinding the material passes through the mill but once and is discharged as near as may be to the desired size. Closed circuit grinding makes use of the same type of grinding mill but continually passes the ground material to a separating device, customarily some form of classifier, which automatically separates material which has been ground to a predetermined fineness, and returns to the mill for regrinding all the material coarser than this.

Open circuit grinding is inefficient because in order to grind all of the material to a given fineness, a large part of it must be ground and reground to a much greater fineness with an excessive expenditure of power. It is also inefficient because, as I shall point out later, the viscosity of the charge within the mill cannot be maintained at the optimum value. In the present open circuit grinding practice the charge is ground so that only 90% passes a 200 mesh sieve with a power consumption of from 5 to 6 kilowatt hours per barrel ground. The product of this process is not a high early strength cement. If the grinding is continued so that 95% passes 200 mesh the power consumption must be doubled. It is possible, therefore, to make a high early strength cement by means of open circuit grinding, but only at the cost of a very high energy expenditure per barrel of material ground. Even so the cement is inferior to one ground to the same percent passing 200 mesh by closed circuit grinding because particle size distribution is better in closed circuit grinding. Thus, when grinding to 95% passing 200 mesh in open circuit, the 5% coarser than 200 is distributed as follows: +100—1.0%; +150—2.5%; whereas in closed circuit (by my method) the distribution of the coarse particles is: +100—0.0%; +150—0.8%. As the coarsest portion of the raw material exerts the greatest influence in retarding combination of the basic and acidic oxides, a cement ground in closed circuit is superior to one ground in open circuit even when both are ground to the same theoretical fineness.

Closed circuit grinding in cement manufacture has, therefore, been recognized as superior to open circuit grinding. It has, however, failed in attainment of real economies because of the fact that it has heretofore been considered necessary to grind with a large excess of water, which has seriously impaired the efficiency of the operation. As a consequence no one prior to my invention has been able commercially to employ closed circuit grinding of cement raw materials for grinding to 95% passing 200 mesh.

My invention is based on the discovery which I have made that not only is the use of excess water unnecessary in wet grinding of cement raw materials, but that very real grinding economies can be effected by grinding with much less than an excess, provided the viscosity of the charge is correct. The viscosity of the raw material as it passes through the mill determines the efficiency with which the balls can grind as they cascade. The viscosity of the material which surrounds the balls determines the relative freeness with which the balls leave this material in their continual rise and fall within the mill and the force of the impact as they fall. I have discovered that the optimum viscosity for most economical and efficient grinding can be attained by correlating fineness of material with water content. This relation of viscosity to efficiency may be illustrated by fixing the rate of feed, the energy input and the quality of material fed to a mill and varying the water content. As the water content is increased grinding efficiency, measured by the percentage passing 200 mesh, increases until a certain point is reached after which further increase in water content results in decreased efficiency. This is graphically illustrated in the curve of Figure 1 in which mill discharge fineness is plotted against grinding dilution for a given material feed. Similarly, for a given fineness of material as it is discharged from the mill a given water content is required to produce a viscosity most favorable for maximum efficiency, and with a viscosity either above or below this value there is a decrease in grinding efficiency. This might be illustrated by fixing the fineness of the discharged product, the rate of feed and quality of material fed and noting the variation in energy required with variation in water content. As the water content is increased the energy required will decrease until a minimum is reached for a given water content, after which the energy required will increase with further increase in water content.

I have further discovered that this viscosity at which maximum grinding efficiency is obtained is constant and can be reproduced for different finenesses of mill discharge by a different water content for each fineness. For example, I have found that with a mill discharge fineness of 35% passing 200 mesh a water content of about 28% gives the maximum grinding efficiency at that fineness and that the efficiency decreases with a greater or lesser water content. This optimum viscosity is reached with a lower water content when the mill discharge is coarser and with a higher water content when the mill discharge is finer. This is illustrated by the curve of Figure 2 in which mill discharge fineness is plotted against grinding dilution for average optimum viscosity.

In accordance with the present invention I take advantage of this correlation between fineness and water content, and produce the optimum viscosity for efficient grinding by carefully regulating the water fed to my mills with reference to the fineness of mill discharge. The utilization of optimum viscosity is particularly advantageous in closed circuit grinding where the fines are continuously eliminated and the charge more uniform in consequence. I have further found it advantageous to grind in more than one stage. As the discharge from the first mill is coarser than that from the succeeding, the water content of the material in the first mill is less than that in the succeeding, and by thus separating the grinding into more than one stage I am able to control the viscosity with a greater nicety and increase the economies of operation.

On the drawings:—

Fig. 1 illustrates a curve showing the relation between mill discharge fineness and grinding dilution;

Fig. 2 illustrates a curve showing the relation between mill discharge fineness and grinding dilution to give average optimum viscosity; and Fig. 3 illustrates a cement plant flow sheet in accordance with the present invention.

In making a high early strength cement by wet grinding in closed circuit to 95% passing 200 mesh I proceed as follows:

The limestone and shale, suitably crushed and proportioned, are fed continuously to a primary mill and ground to a relatively coarse discharge size. I have found grinding to about 18% passing 200 mesh satisfactory, although other finenesses of comparable magnitude might be used. Having decided upon the discharge size, the water content for optimum viscosity is fixed. By referring to the viscosity curve of Figure 2 it will be found that for a fineness of 18% passing 200 mesh a water content of about 24% is necessary for maximum grinding efficiency.

The discharge from the primary mill is fed to a separator from which the finer portions overflow to the secondary grinding unit and the coarser are returned to the primary mill for regrinding. Of this overflow about 40% will pass 200 mesh. From the primary separator the overflow is fed directly to a secondary separator where a further separation takes place and the overflow is of the desired ultimate fineness, i. e. 95% passing 200 mesh. The bulk of the overflow from the primary separator is coarser than this and is fed from the secondary separator to a secondary mill where it is ground to a discharge size relatively finer than that from the primary mill. I have found grinding to about 35% passing 200 mesh satisfactory, although here, as in the case of the primary grinding, other comparable degrees of fineness might be chosen. Referring once more to the viscosity curve of Figure 2, it will be seen that for a discharge fineness of 35% passing 200 mesh a water content of approximately 28% is required for maximum grinding efficiency and the water fed to the secondary mill proportioned accordingly. The discharge from the secondary mill is also fed to the secondary separator and the finer particles, about 95% passing 200 mesh, overflow and are carried to a thickener or other apparatus for removing as much of the water as feasible before the product is fed to the kilns.

The output of the mill is determined by a number of factors such as the rate of feed and the power at which the mills are operated, these, in turn, being dependent upon the condition of the raw materials. It is fundamental, however, that whatever the rate of feed or mill power may be the grinding dilution must be correlated to the fineness of discharge in order to attain optimum viscosity and hence maximum grinding efficiency.

In Figure 3 of the accompanying drawings I have illustrated a flow sheet of a cement plant constructed to operate in accordance with the present invention. A study of this flow sheet together with the detailed description of plant operation which follows will make clear the principles involved. It is, of course, understood that this description is given by way of example only and that various modifications could be, and would be, made to fit varying conditions.

The raw material, limestone and shale, is given a preliminary crushing or disintegration in gyratory crushers and hammer mills. This preliminary crushing to ¾ inch is done dry. After being crushed to ¾ inch the shale and limestone are stored in stock piles and the desired quantities of each are obtained as needed. The approximate proportioning of the raw materials in the mixture is obtained by feeders which roughly proportion the amounts of limestone and shale before they go to the fine grinding mills. This ¾ inch rock contains about 7% by weight finer than 200 mesh.

The fine grinding circuit is divided into two separate complete units, each composed of a primary ball mill in closed circuit with a primary classifier of the Dorr type, and a secondary ball or tube mill in closed circuit with a secondary Dorr classifier of the bowl type. The reason for having two complete separate units is to provide flexibility in operation. The reason for dividing each grinding unit into primary and secondary circuit is because it has been found, as stated above, that grinding from ¾ inch to 95% passing 200 mesh can be accomplished more economically when done in two steps.

The raw material properly proportioned and crushed to ¾ inch is continuously fed dry directly to the ball mill in the primary circuit. Water is added at this point. This coarse material is ground to a limited degree in its first passage through the ball mill, discharging directly into the primary classifier where the finished ground portion is overflowed directly, the coarse material being raked out of the solution and added to the new feed to the mill. The discharge from the primary mill is relatively coarse, about 18% passing 200 mesh and the rake product from the classifier will be fairly granular and coarse and will contain about 20% water by weight. Water will be added to the material as it enters the primary mill in a sufficient quantity to bring the moisture content of the material entering the mill to about 24%, this being the amount of water necessary to produce the optimum viscosity or mobility for the given coarse discharge. Water is added to the classifier in a sufficient quantity to bring the overflow to a dilution of 2 parts of water to 1 part of solids by weight (66⅔% water). The overflow from the primary classifier will be of a fineness of about 40% passing 200 mesh.

After overflowing the primary classifier the raw material all passes directly to the secondary or bowl classifier, where the fine material overflows the periphery of the bowl and the coarse material settles to the bottom of the classifier and is raked out and discharged into the secondary grinding mill. The new material entering the bowl classifier will be about 40% finer than 200 mesh. This 40% of the new feed entering the bowl classifier will overflow directly and leave the grinding circuit so that the rake product will be free of this fine material. The water in the rake product will amount to about 25% by weight. Before it enters the secondary mill, water will be added in sufficient quantity to produce the optimum viscosity for the material in the mill. In this case the water content will be about 28%. Due to the granular nature of the material entering the secondary mill this amount of water will be considerably less than that necessary if the fine material that overflowed in the bowl also entered the mill. The material discharged from the secondary mill will be ground to a definite fineness, about 35.0% passing 200 mesh, but will not be ground sufficiently for all of it to overflow at the desired fineness. The coarse portion in the mill discharge will therefore settle in the bottom of the bowl classifier and join the coarse portion of the new feed to be raked up the classifier back and into the mill for additional grinding. Water will be added to the bowl in a quantity sufficient to obtain the desired separation. This desired separation in this case is 95% passing 200 mesh, and the overflow dilution will be approximately 5½ parts of water to 1 part of solids by weight.

The finished ground raw material overflowing from the secondary classifier is sampled for calcium carbonate analysis and the limestone and shale proportioned accordingly.

The bowl classifier overflow then passes to a Dorr thickener where the raw material is partially dewatered. Clear water overflows the periphery of the thickener, the thickened raw material, now called a slurry, discharging from the bottom of the thickener to a density control device and is pumped from there to slurry mixers. The slurry mixers are necessary in order to hold the slurry until chemical analyses can be made and the slurry properly proportioned before going to the kiln. In operation the thickener underflow is sent to one slurry mixer for a certain time and to another slurry mixer for another time. Calcium carbonate analysis is made of these two tanks of slurry and proportioning is then made so that the final mixture is of the composition previously determined as being suitable to manufacture the desired quality cement.

Filters are shown in this layout as further dewatering the thickener underflow. The thickener underflow would be about 35% water which is about the same moisture as would be used if the raw material had been ground in the usual open circuit method. The filters are not a necessity and will not always be used. We may, therefore, consider the material as passing directly from the kiln feed storage basin to the kiln, and dewatering will take place in the front or feed end of the kiln.

The kiln operation is divided into four distinct steps. The first is drying or dewatering the slurry and bringing it up to calcining temperature. The second is calcination, where the $CO_2$ is liberated and the material brought up to clinkering temperature. In the third or clinkering step the basic and acidic oxides of the raw material are combined to produce the desired cement. After clinkering the fourth step is cooling of the clinkers from calcining temperature to the discharge temperature.

The cooling clinker is then mixed with 2–3% gypsum and ground dry in ball mills to a finished fineness of 85–95% passing 200 mesh. Complete chemical analyses are made of the ground clinker or cement and daily calculations are made on the proportion of the raw materials as based on calcium carbonate determinations of the ground slurry.

By means of the process of the present invention I have succeeded in producing a superior early strength cement with a marked decrease in energy expenditure per barrel. I can grind raw material to pass 95% through 200 mesh with an energy consumption of about 2.5 kilowatt hours per barrel as compared with from 10 to 12 kilowatt hours in the best open circuit practice and from 4.0 to 5.0 in the best cement raw material closed circuit practice previously proposed.

I claim:

1. The process of making cement which comprises grinding the raw materials to a predetermined discharge fineness in the presence of water, hydraulically removing the finer portion and regrinding the coarser, the amount of water present during grinding being not more than that necessary to produce optimum viscosity at the given fineness of discharge and less than that required for hydraulically removing the finer particles.

2. The process of making cement which comprises grinding the raw materials to a predetermined discharge fineness in a primary mill in the presence of water sufficient only to produce optimum viscosity at the given fineness, adding water to the mill discharge and hydraulically separating the finer from the coarser portions, returning the coarser for regrinding in the primary mill, and passing the finer portion to a secondary mill for further grinding to a predetermined fineness at a dilution greater than that in the primary mill and sufficient only to produce optimum viscosity at the fineness of secondary mill discharge.

3. The process of making cement which comprises continuously feeding raw materials to a primary mill, grinding the materials therein to a predetermined discharge fineness at a dilution producing optimum viscosity at the given discharge fineness, separating the finer portion from the coarser, returning the coarser for regrinding in the primary mill, passing the finer portion to a secondary mill, grinding to a predetermined discharge fineness at a dilution in excess of said first mentioned dilution, producing optimum viscosity at the given discharge fineness, again separating the finer portion from the coarser, and returning the coarser for regrinding in the secondary mill.

4. The process of making cement which comprises continuously feeding raw materials to a primary mill, grinding them at a given dilution such that a given per cent of mill discharge is less than a predetermined minimum size, passing the mill discharge to a primary separator to separate the finer portion from the coarser, returning the coarser to the primary mill for regrinding, passing the finer portion to a secondary separator to effect a further separation of fine and coarse portions, passing the coarser portion of the secondary separation at a second given dilution such that a second given per cent of the mill discharge is less than said predetermined minimum size, said first given dilution and said first percentage being less than said second given dilution and percentage, passing the secondary mill discharge to the secondary separator to separate the finer portion from the coarser, overflowing the finer to a dewatering apparatus, and returning the coarser to the secondary mill for regrinding.

5. The process of making high early strength cement which comprises continuously feeding crushed shale and limestone to a primary mill, grinding them to such fineness in the presence of about 24% water that about 18% passes through a 200 mesh screen, passing the mill discharge to a primary separator to separate the finer portion from the coarser, returning the coarser to the primary mill for regrinding, passing the finer portion, of which about 40% will pass 200 mesh, to a secondary separator to effect a further separation of fine and coarse portions, passing the coarser portion of the secondary separation to a secondary mill, grinding to such fineness in the presence of about 28% water that about 35% passes 200 mesh, passing the secondary mill discharge to the secondary separator to separate the finer portion from the coarser, overflowing the finer of which 95% will pass 200 mesh to a thickener, and returning the coarser to the secondary mill for regrinding.

6. The process of wet grinding cement raw materials in closed circuit which comprises first grinding to a relatively coarse discharge size in the presence of sufficient water to produce a given viscosity, separating the coarser from the finer materials discharged, returning the coarser for regrinding, and separately grinding the finer materials to a relatively finer discharge size in the presence of sufficient water to produce substantially the same given viscosity.

7. The process of making cement which comprises feeding raw materials to a mill, grinding the materials therein in a limited amount of water giving the optimum viscosity of mill discharge, classifying the diluted material to separate out the finished material, dewatering and returning the oversize to the mill, and removing from the finished material by sedimentation a part of the water added before classification, to reduce the moisture content to an amount giving optimum viscosity for the necessary subsequent pumping and mixing prior to feeding to the kiln, said latter moisture content being higher than the moisture content present in the grinding step.

8. The process of making cement which comprises feeding raw materials to a primary mill, grinding the materials therein in the presence of a limited amount of water giving the optimum viscosity of mill discharge, adding water to the mill discharge, classifying the diluted material to separate out the finer material at a dilution greater than that of the mill discharge, returning the oversize to the mill, further diluting the said finer material, classifying the finer material to separate out the finished material from oversize material, passing the oversize to a secondary mill with a moisture content greater than that maintained in the primary mill but limited to give substantially the same viscosity of mill discharge to the further diluted finer material, and dewatering the said finished material to a water content in excess of that present in any of the preceding grinding steps.

9. The process of making cement which comprises feeding raw materials to a mill, grinding the materials therein in the presence of a given amount of water, diluting the mill discharge, classifying the diluted material to separate out the finished material at a dilution greater than that of the mill discharge, dewatering and returning the oversize material to the mill, sampling the finished material in the diluted state for calcium carbonate analysis and thereafter dewatering the said finished material.

ERNEST J. MAUST.